United States Patent [19]
Tani

[11] Patent Number: 6,023,730
[45] Date of Patent: Feb. 8, 2000

[54] COMMUNICATION SYSTEM WITH SEPARATE CONTROL NETWORK FOR MANAGING STREAM DATA PATH

[75] Inventor: Hideaki Tani, Tokyo, Japan

[73] Assignee: Digital Vision Laboratories Corporation, Tokyo, Japan

[21] Appl. No.: 08/856,389

[22] Filed: May 14, 1997

[30] Foreign Application Priority Data

Sep. 13, 1996 [JP] Japan .................................. 8-243560

[51] Int. Cl.[7] .................................................. G06F 15/16
[52] U.S. Cl. ...................... 709/231; 709/204; 370/400; 370/409
[58] Field of Search ..................... 395/200.61, 200.48; 370/389, 395, 462, 400, 409; 709/231, 209

[56] References Cited

U.S. PATENT DOCUMENTS

| | | | |
|---|---|---|---|
| 4,905,231 | 2/1990 | Leung et al. | 370/400 |
| 5,608,726 | 3/1997 | Virgile | 370/401 |
| 5,717,854 | 2/1998 | Egawa | 395/200.2 |
| 5,752,003 | 5/1998 | Hart | 709/223 |
| 5,761,417 | 6/1998 | Henley | 395/200.09 |
| 5,809,078 | 9/1998 | Tani | 375/259 |
| 5,928,331 | 7/1999 | Bushmitch | 709/231 |

OTHER PUBLICATIONS

"Terminals for Telematic Services," *International Telecommunication Union, Recommendation T.122*, 1–41, Mar. 1993.

J. Case et al., "Structure of Management Information for version 2 of the Simple Network Management Protocol (SNMPv2)", *Internet Engineering Task Force Request for Comments*:1442, 1–54, Apr. 1993.

H. Schulzrinne et al., RTP: A Transport Protocol for Real Time Applications, *Internet Engineering Task Force Request for Comments*: 1889, 1–75, Jan. 1996.

*Primary Examiner*—Dung C Dinh
*Attorney, Agent, or Firm*—Christensen O'Connor Johnson & Kindness PLLC

[57] ABSTRACT

A communication system includes a control communication network for transferring control data, and a data communication network for transferring stream data. A communication node is set on the communication system in response to a request on the stream transfer. The communication node is connected to both of the above networks and transfers data via the data communication network under the control based on the control data. The communication node controls access by an application and transfer of stream data by referring to a transfer control table which holds the relation of connection with another control communication node which transfers the common data and the corresponding relation to a control node (application) associated with data transfer defined by the connecting relation.

14 Claims, 11 Drawing Sheets

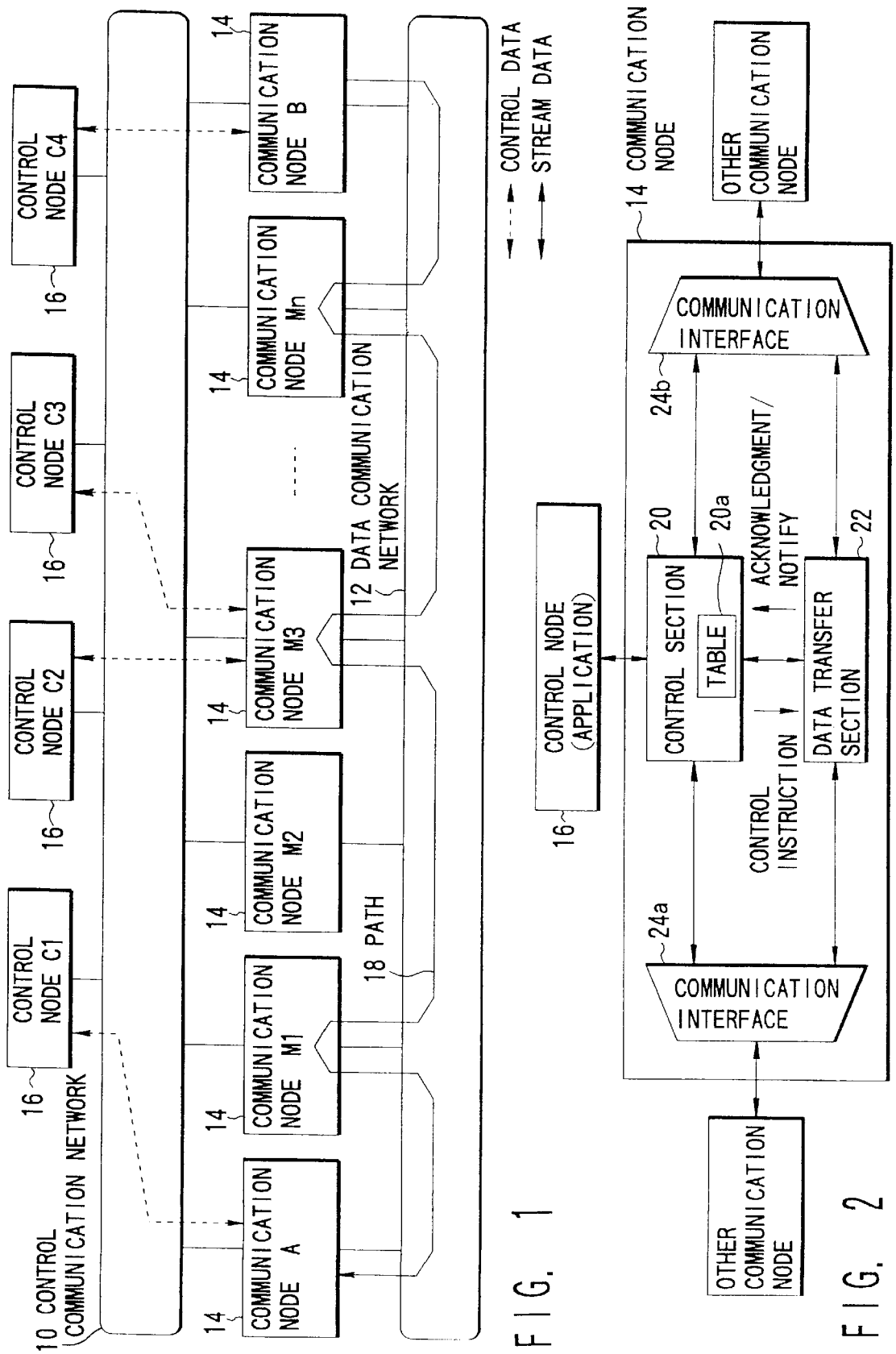

| STREAM ID | COMMUNICATION NODE | SOURCE | DESTINATION | APPLICATION |
|---|---|---|---|---|
| S1 | A | — | M1 | P1 |
|  |  | M1 | OUTPUT DEVICE |  |

| S1 | M1 | A | M3 | — |
|---|---|---|---|---|
|  |  | M3 | A |  |

| S1 | M3 | M1 | Mn | P2, P3 |
|---|---|---|---|---|
|  |  | Mn | M1 |  |

| S1 | Mn | M3 | B | — |
|---|---|---|---|---|
|  |  | B | M3 |  |

| S1 | B | Mn | OUTPUT DEVICE | P4 |
|---|---|---|---|---|
|  |  | INPUT DEVICE | Mn |  |

CONTROL DATA

| SOURCE NODE ID | DESTINATION NODE ID | MESSAGE ID | PARAMETERS |
|---|---|---|---|

| MESSAGE TITLE | ABBREVIATION | ADDED PARAMETERS |
|---|---|---|
| SET STREAM ID | set-id | STREAM IDENTIFICATION |
| CHANGE MASTER NODE | master | COMMUNICATION NODE IDENTIFICATION |
| EXTEND NODE CONNECT | extend | COMMUNICATION NODE IDENTIFICATION |
| ADD ADJACENT NODE | add-node | COMMUNICATION NODE IDENTIFICATION |
| REMOVE ADJACENT NODE | remove-node | COMMUNICATION NODE IDENTIFICATION |
| ADD APPLICATION | add-app | APPLICATION IDENTIFICATION/STREAM IDENTIFICATION |
| REMOVE APPLICATION | remove-app | APPLICATION IDENTIFICATION/STREAM IDENTIFICATION |
| ACQUIRE TRANSFERRING PARAMETERS | get-qos | IDENTIFICATION OF TRANSFERRING QUALITY CONDITION |
| SET TRANSFERRING PARAMETERS | set-qos | IDENTIFICATION OF TRANSFERRING QUALITY CONDITION/SETTING VALUE/PROCESSING IDENTIFICATION UNDER ABNORMAL CONDITIONS |
| START TRANSFERRING | start | NO PARAMETER |
| STOP TRANSFERRING | stop | NO PARAMETER |
| ACQUIRE STATE DATA | get-stat | IDENTIFICATION OF STATE DATA |
| ACQUIRE TRANSFERRING PARAMETERS | get-param | IDENTIFICATION OF TRANSFERRING CONTROL PARAMETER |
| SET TRANSFERRING PARAMETERS | set-param | IDENTIFICATION OF TRANSFERRING CONTROL PARAMETER/SETTING VALUE |
| ACKNOWLEDGMENT | ack | COMMAND IDENTIFICATION/RESULT INFORMATION |
| NOTIFY | notify | NOTIFY ITEM IDENTIFICATION/NOTIFY CONTENTS |
| POLLING | poll | POLLING ITEM IDENTIFICATION/UPDATED VALUE |

FIG. 5

COMMUNICATION SYSTEM WITH SEPARATE CONTROL NETWORK FOR MANAGING STREAM DATA PATH

BACKGROUND OF THE INVENTION

This invention relates to a communication system for transferring desired stream data, and more particularly to a communication system and a communication path control method for transferring stream data such as video data from a transmission node to a reception node in a network.

The entire contents of Japanese Patent Application No. 8-243560 filed on Sep. 13, 1996 are incorporated herein by reference.

Recently, as the computer network technology and the communication technique of digital information are developed, a system for transferring a string of data items (which is hereinafter referred to as stream data) constructed on the time series to realize "video on demand", for example, is developed.

In the above system, for example, a requested video signal such as a moving picture is sequentially converted into digital information (picture frames). Further, the digital information is transferred as stream data from a transmission node which is a source node (video server or the like) to a reception node which is a destination node (user terminal, client or the like) via a communication path on the network. At this time, the transfer rate of the stream data is determined dependent on the reception speed of the reception node side.

Therefore, in the process of transferring continuous data such as stream data, the transmission node side cannot effect the sequential process of transferring batches of requested stream data at a high transfer rate and then effecting the stream data transferring process in response to a next request. That is, the transmission node side cannot be released until the stream data transferring process is completed.

As a system for solving the above problem, there is provided a system for providing a relay node on a communication system for transferring stream data and temporarily buffering stream data transferred from the transmission node into a buffer memory by use of the relay node. With the above system, the transmission node can transfer batches of stream data at a high transfer rate irrespective of the reception speed of the reception node. The relay node buffers stream data transferred from the transmission node and then transfers the same to the reception node side at a transfer rate corresponding to the reception processing speed.

A plurality of relay nodes can be provided between communication nodes (transmission node, reception node) for transferring stream data. When communication is made between communication nodes connected to the network, it is possible to set a stream transfer path including some other communication nodes connected to the network as relay nodes according to a control instruction from a control node.

While the stream data is being transferred via a plurality of communication nodes, a server or the control node which is previously determined in the communication system is required to acquire the state of each communication node and set operation parameters in order to change the stream transfer path to an adequate stream transfer path.

As the applicable technique for acquiring the state of each communication node and setting the operation parameters, a method for directly controlling each communication node by use of an SNMP (Simple Network Management Protocol) which is a management protocol of Internet standard from the control node, and a method which is similar to the above method and uses a CMIP (Common Management Information Protocol) which is a management protocol of OSI (Open System Interface) standard permitting the hierarchical structure on the control node side are known.

In the conventional communication system, transfer of stream data flowing via a plurality of communication nodes on the network is managed and controlled by the control node using a management protocol such as SNMP, CMIP.

The conventional management protocol such as SNMP, CMIP is designed for the purpose of controlling a network device and generally constructed to effect the management operation for part of or whole portion of the hardware device and a management information model representing the structure of a to-be-managed object is generally represented by a static description. Further, use of the conventional management protocol is permitted only for operators having the privilege of managing the network.

Therefore, in the conventional communication system, since the control node effects the transfer control and management of stream data according to the management protocol described before, a communication node itself (or application associated with the communication node) for effecting data transfer cannot manage or control the transfer of individual stream data items transferred on the network according to the application form of the stream data. Therefore, fixing of the transfer control and management imposes restrictions on the operation of transferring stream data via a plurality of communication nodes on the network.

In a case where a communication node itself for transferring data manages and controls the transfer of stream data, stream transfer on the network occurs between any communication nodes, the communication node is frequently set or released and a large number of streams simultaneously flow on the same communication node.

Therefore, in order to manage and control the transfer of stream data, the parameter control process and acquisition of the state of stream transfer between terminal nodes (communication nodes) on the network are required. However, since the conventional management protocol is designed for the purpose of control of the network device, the management protocol is insufficient in function.

Further, in a case where the communication node itself effects the management and control of stream data transfer, the transfer of stream data is effected by use of an application associated with the communication node and accesses from a plurality of user applications relating to the stream transfer may occur, and therefore, a plurality of unspecified communication nodes will acquire the state of stream transfer and effect the parameter control. As a result, if the process of managing and controlling desired stream transfer is permitted simply by use of the conventional management protocol in each communication node, a problem occurs in the security management of stream data.

Further, in the conventional communication system, in a case where a control message cannot be directly transferred from the control node to each communication node, it is necessary to use some communication nodes as relay nodes for control communication. Memory resources on the communication nodes are consumed by the overhead for managing the connection structure and this may impose a restriction on the maximum number of streams which one communication node can process.

BRIEF SUMMARY OF THE INVENTION

An object of this invention is to provide a communication system capable of managing or controlling the transfer of individual stream data items transferred on the network according to the application form of the stream data and ensuring the security by permitting the management and control operation only for a user application relating to the stream data.

According to one aspect of this invention, there is provided a communication system comprising: a control communication network for transferring control data; a data communication network for transferring data; a plurality of communication nodes connected to the control communication network and data communication network; and at least one control means for controlling data transfer by the plurality of communication nodes, each of the control means being connected to one of the control communication network and data communication network or one of the plurality of communication nodes; wherein each of the plurality of communication nodes includes: a control table; setting means for setting information indicating the transfer/ reception direction of data transferred in predetermined data transfer and information indicating the control means associated with the data transfer and the communication node thereof into the control table according to control data transferred via the control communication network; and transferring means for transferring data transferred via the data communication network according to information stored in the control table.

According to a second aspect of this invention, there is provided a communication path control method for a plurality of communication nodes which are connected to a control communication network for transferring control data and a data communication network for transferring data, in which data transfer can be controlled by external control means and which each have a control table, comprising the steps of: setting information indicating a data transferring/ receiving direction of data transferred in predetermined data transfer and information indicating the control means associated with the data transfer and the communication node thereof into the control table according to control data transferred via the control communication network; and transferring for transferring data transferred via the data communication network according to information stored in the control table.

With the above construction, it becomes possible to manage or control the transfer of individual stream data items transferred on the network according to the application form of the stream data, ensure the security since access to the stream can be limited to a related user application or applications, and simultaneously receive accesses from a plurality of user applications. Further, by using the same transfer path for the transfer path of a control message and the transfer path of stream data, the overhead for managing the connection structure can be reduced and the maximum number of streams which can be processed by one node can be increased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiments given below, serve to explain the principles of the invention.

FIG. 1 is a block diagram showing the construction of a communication system according to one embodiment of this invention;

FIG. 2 is a diagram showing the functional construction of a communication node in the communication system shown in FIG. 1;

FIG. 5 is a diagram showing a list of control data items (control messages) and the types of attached parameters corresponding to the control messages in the communication system shown in FIG. 1;

DETAILED DESCRIPTION OF THE INVENTION

Figures 3A, 3B, 3C, 3D, 3E, 4A, 4B:
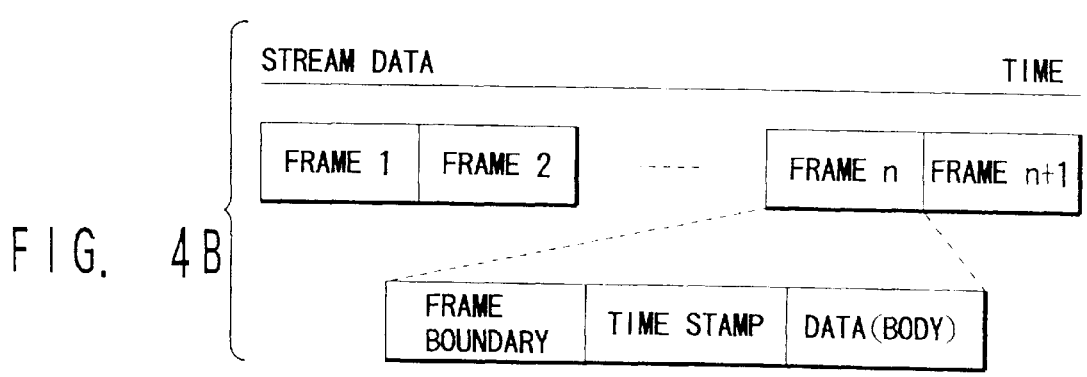
FIGS. 3A to 3E are diagrams showing examples of transfer control tables transferred to the respective communication nodes to realize the stream transfer in the communication system shown in FIG. 1.
FIGS. 4A and 4B are diagrams showing the conceptional data formats of control data and stream data in the communication system shown in FIG. 1.

There will now be described an embodiment of this invention with reference to the accompanying drawings.

The construction of a communication system according to this embodiment is shown in FIG. 1. FIG. 1 does not show the physical construction of the communication system but shows the functional construction thereof based on the conceptional design. The physical construction for realizing the communication system shown in FIG. 1 is described later.

As shown in FIG. 1, the communication system of this embodiment is constructed by a control communication network 10, data communication network 12, a plurality of communication nodes 14 and at least one control node 16. There are provided four control nodes C1 to C4 in this system shown in FIG. 1, but the number of the control nodes 16 can be more or less than four.

The control communication network 10 is a path for permitting communication of various types of control data items (messages) between one of the communication nodes 14 and one of the control nodes 16 or between the communication nodes 14. Control data will be described in detail later.

The data communication network 12 is a path for permitting transfer of stream data between the communication nodes 14. Stream data is a string of data items having a large number of data elements (data frames) called frames constructed on the time series and is data having a significance in its continuity. The detail explanation therefor is made later.

The communication nodes 14 are connected to both of the control communication network 10 and the data communication network 12, each communication node can communicate various control data with respect to another communication node 14 via the control communication network 10, and at the same time, a communication path 18 (stream transfer path) can be set via desired communication nodes 14 can be set on the data communication network 12 to transfer stream data.

Each control node 16 can communicate control data with respect to one or more communication nodes 14 via the control communication network 10. The control node C1 of the control nodes 16 can control (set the stream transfer path) and manage (acquire the state of transfer of stream data) the transfer of stream data by transferring various control data to the communication node A via the control communication network 10. The control node C2 can control and manage the same to the communication node M3, the control node C3 can control and manage the same to the communication node M3, and the control node C4 can control and manage the same to the communication node B.

Next, the construction of the communication node 14 is explained.

The conceptional construction of the communication node 14 is shown in FIG. 2. As shown in FIG. 2, the communication node 14 includes a control section 20, data transfer section 22, and communication interfaces 24a, 24b.

The control section 20 controls the data transfer section 22 and communication interfaces 24a, 24b constructing the communication node 14, communicates control data (various messages) with respect to the control node 16 or application and executes a process corresponding to the content of control data. The control section 20 manages a quality control parameters, statistical data, and transfer control parameters relating to the transfer of stream data. The transfer control parameters contain the transmission rate, maximum value of buffering, data discarding condition and the like. The quality control parameters contain allowable values for variations in the End-End data loss rate and End-End delay. The statistical data contains the byte number of transferred stream data, number of detected transfer errors, data arrival interval, data transmission interval and the like.

The control section 20 has a transfer control table 20a indicating the relation of connection with an adjacent communication node 14 or application and manages the same. A concrete example of the transfer control table 20a is explained later. The control section 20 has a function of determining the presence or absence of access right with respect to control data from the application by referring to the transfer control table 20a.

The data transfer section 22 performs the transfer of stream data which is input and output via the communication interfaces 24a, 24b under the control of the control section 20.

The communication interfaces 24a, 24b are interfaces for communication with another communication node 14, and control data (control message) is transferred with respect to the control section 20 and stream data is transferred with respect to the data transfer section 22.

The communication node 14 is realized by use of a software on a network device in the physical construction constructing the communication system and is created when required. Further, a plurality of communication nodes 14 for different data streams can be simultaneously operated on one network device. Each communication node 14 has a stream identifier for identifying a stream associated therewith, and when stream data is received and other communication nodes 14 exist on the same network device, it can determine whether the received stream data is the associated stream data or not by referring to the stream identifier for the received stream data. Creation of the communication node 14 will be described later in detail.

Like the communication node 14, the application is realized by use of a software on the network device, has a certain relation with respect to the transfer of stream data and has a function of issuing various requests relating to the stream data transfer to the communication node 14. For example, the application issues requests for construction of the stream transfer path, starting of the transfer of stream data, and acquisition of the state of stream transfer and transfer control parameters.

Next, the transfer control table 20a managed by the control section 20 is explained in detail. Examples of settings in the transfer control table are shown in FIGS. 3A to 3E.

In this embodiment, in the control communication network 10 and data communication network 12, the operation of controlling the path for transferring control data and stream data is managed by use of the same transfer control table and the control data is transferred between the communication nodes 14 contained in the stream transfer path.

Tables shown in FIGS. 3A to 3E are transfer control tables 20a in the respective communication nodes 14 when the communication path 18 extending from the communication node A shown in FIG. 1 to the communication node B via the communication nodes M1, M3 and Mn is set.

In each of the transfer control tables 20a managed by the corresponding node, data (communication node or device) indicating source and destination areas via which data is transferred is registered and data (applications P1, P2, P3, P4) indicating the applications connected to the corresponding communication node is registered.

In each communication node 14, normal stream data and control data supplied via the source area are transferred to the destination area. In addition, in a case where data indicating an application is registered, control data is transferred to the specified application when control data has reached the corresponding communication node 14. Further, control data input to the application is checked to determine whether the access right is present or not by referring to the registered content of the application in the transfer control table, and if the control data is determined to be control data issued from the application having the access right, it is transferred to all of the destination areas from the communication node 14.

Like the example of the transfer control table shown in FIG. 3E, if data indicating an input device is registered in the source area, stream data is not given from another communication node 14 but is given from a corresponding communication node 14, that is, an input device belonging to the communication node B. Likewise, if data indicating an output device is registered in the destination area as in the case of the example of the transfer control table shown in FIG. 3A, stream data is not given to another communication node 14 but is given to a corresponding communication node 14, that is, an output device belonging to the communication node A.

Next, the conceptional formats of control data and stream data in this embodiment are explained with reference to FIGS. 4A and 4B.

As shown in FIG. 4A, control data is constructed by a transmission node identifier, destination node identifier, message identifier and attached parameters.

In the transmission node identifier, an identifier for identifying the communication node 14 or application which issues the message is entered. In the destination node identifier, one of the following items (1) to (3) can be specified.

(1) An identifier of the single communication node 14, or a list of identifiers of a plurality of communication nodes 14.

(2) An identifier indicating broadcasting to all of the communication nodes 14 contained in the data stream transfer path.

(3) An identifier indicating the terminal node of the data stream transfer path.

A list of control data items (control messages) in this embodiment and the types of attached parameters corresponding to the control messages are shown in FIG. 5. The application method of the control messages is described later.

As shown in FIG. 4B, stream data is constructed by a large number of frames (for example, data elements which are the units of image information). Each frame is constructed by a frame boundary portion which is a head portion, time stamp and data body. The time stamp is time information indicating a time difference from the front end of the stream data.

Next, the master node and slave node in the communication system of this embodiment are explained.

In the communication system of this embodiment, one of a plurality of communication nodes constructing a series of stream transfer paths is set as a master node having the right to effect the transfer control and the other nodes are operated as slave nodes following a control instruction from the master node.

The master node has the right equivalent to the right of an application (control node 16) which will be described later for the communication nodes 14 contained in the stream transfer path to which the master node belongs and the master node can issue control data (message).

The master node effects the process relating to the management of the whole stream transfer process. When a control message is given from an application connected to one of the communication nodes 14 constructing the stream transfer path, the control message is first transferred to the master node if the content thereof indicates a modification of the stream transfer processing operation. Further, if the content thereof does not indicate a modification of the transfer processing operation and indicates an inquiry about the state of the stream transfer, for example, transfer to the master node is not necessary, and therefore, the master node can assign its own role to another communication node 14. The process of setting the master node and the process of assigning the role of the master node to another communication node 14 will be described later.

Next, the concrete (physical) construction realizing the communication system having the functional construction as described above is explained.

Figure 6:
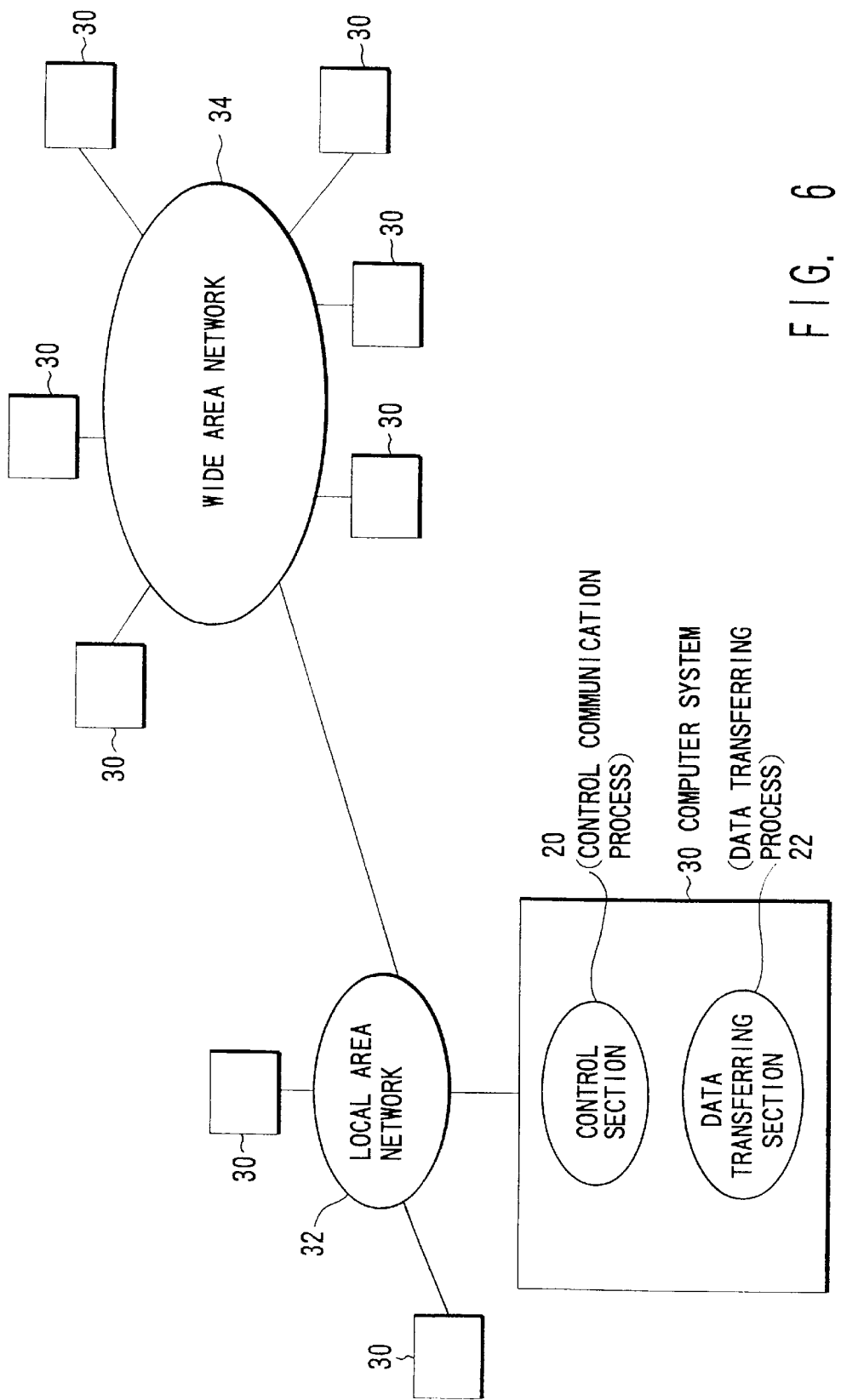
FIG. 6 is a diagram showing an example in which the communication node shown in FIG. 1 is realized by a process on a computer.

An example in which a communication node 14 is realized by a process on a computer is shown in FIG. 6. In the communication system shown in FIG. 6, a large number of computer systems 30 are connected to a local data communication network 32 or wide area data communication network 34 and data transfer is effected between desired computer systems 30 via the communication network.

In the above communication network, (1) the physical node is realized by the computer system 30 and the computer system 30 includes a host computer and a personal terminal;

(2) the physical network is the local data communication network 32 and wide area data communication network 34 and realizes the control communication network 10 and data communication network 12;

(3) the communication nodes are operating processes (control communication process, data transfer process) executed on the computer system 30 with the control section 20 and data transfer section 22 and are created as required;

(4) the control communication is realized by datagram communication between processes created on different computer systems 30; and (5) data transfer is realized by datagram communication via a communication network between processes created on different computer systems 30.

Next, an example in which a communication node 14 realized by a combination of the network relay unit and the management node is explained with reference to FIG. 7.

Figure 7:
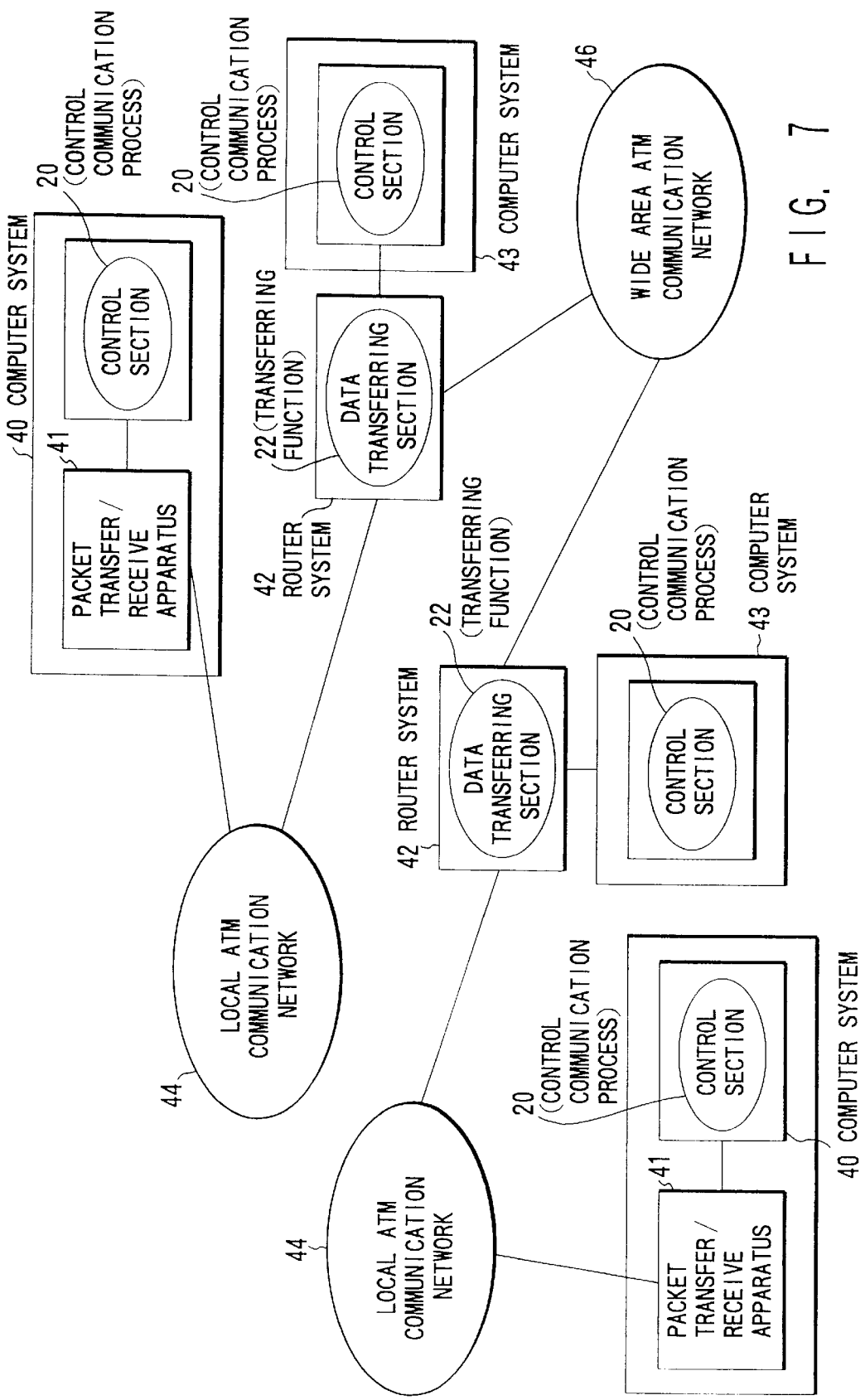
FIG. 7 is a diagram showing an example in which the communication node shown in FIG. 1 is realized by a combination of a network relay device and a management node.

In the communication system shown in FIG. 7, a computer system 40 is connected to a packet transfer/receive apparatus 41 which is connected to a router 42 via a local ATM communication network 44 and a computer system 43 is connected to the router 42. With this connection, data transfer can be performed between desired computer systems 40, 43 via the local ATM communication network 44 or wide area ATM communication network 46.

In the above communication system, (1) the physical node is realized by a combination of the packet transfer/receive apparatus 41 and the computer system 40 for controlling the same and a combination of the router 42 and the computer system 43 for controlling the same;

(2) the physical network is the local ATM communication network 44 and wide area ATM communication network 46 and realizes the control communication network 10 and data communication network 12;

(3) the communication nodes are operating processes (control communication processes) executed on the computer systems 40, 43 and created as required and the data transfer section 22 is realized by the transfer function of the router 42;

(4) the control communication is realized by datagram communication between control communication processes created on different computer systems 30; and (5) data transfer is realized by the control program between the routers 42.

In the constructions shown in FIGS. 6 and 7, the application (function associated with stream data transfer) in this embodiment may be realized in any position on the construction. Normally, the application is a process created based on the application program associated with stream data transfer on the computer systems 30, 40, 43.

The concrete constructions of the communication system shown in FIGS. 6 and 7 are only examples and this invention can be applied to any type of communication system with construction different from the constructions shown in FIGS. 6 and 7 if it is a communication system which can realize the construction and function shown in FIG. 1.

Next, the operation of this embodiment is explained.

First, creation of communication nodes and initialization process are explained. In order to cause a communication node 14 to be associated with one stream transfer path, it is required for the communication node 14 to make ready for reception of control data on the network device (computer systems 30, 40 in FIGS. 6 and 7).

A method for creating the communication node 14 and initializing the same can be attained by use of a construction for previously creating a necessary number of communication nodes 14 on the network device or a construction for always holding a module which manages creation/destruction of the communication node 14 and creating the communication node each time a request is made from another communication node 14 or application.

The application for constructing the stream transfer path transfers a "set_id" message which is control data indicating setting of stream identifier to a communication node 14 lying on the directly accessible network device, for example, on the same network device and sets an inherent stream identifier indicating stream data to be transferred. The stream identifier is registered in a preset column of the transfer control table.

Then, the application transfers an "add_app" message indicating connection of application and having its own application identifier attached thereto to the same communication node 14 and registers an application identifier in the column of the application of the transfer control table which is managed by the control section 20 of the communication node 14.

Further, the application transfers a "master" message indicating assignment of the master node to the communication node 14 to give the role of the initial master node to the communication node 14.

Next, the process of setting the stream transfer path in the communication system is explained.

The communication node 14 constructs a stream transfer path to transfer stream data. The communication node 14 utilizes an "add_node" message indicating connection to an adjacent node and an "extend" message indicating extension of node connection to provide a stream transfer path by transferring the messages to another communication node 14 via the control communication network 10.

Figure 8:
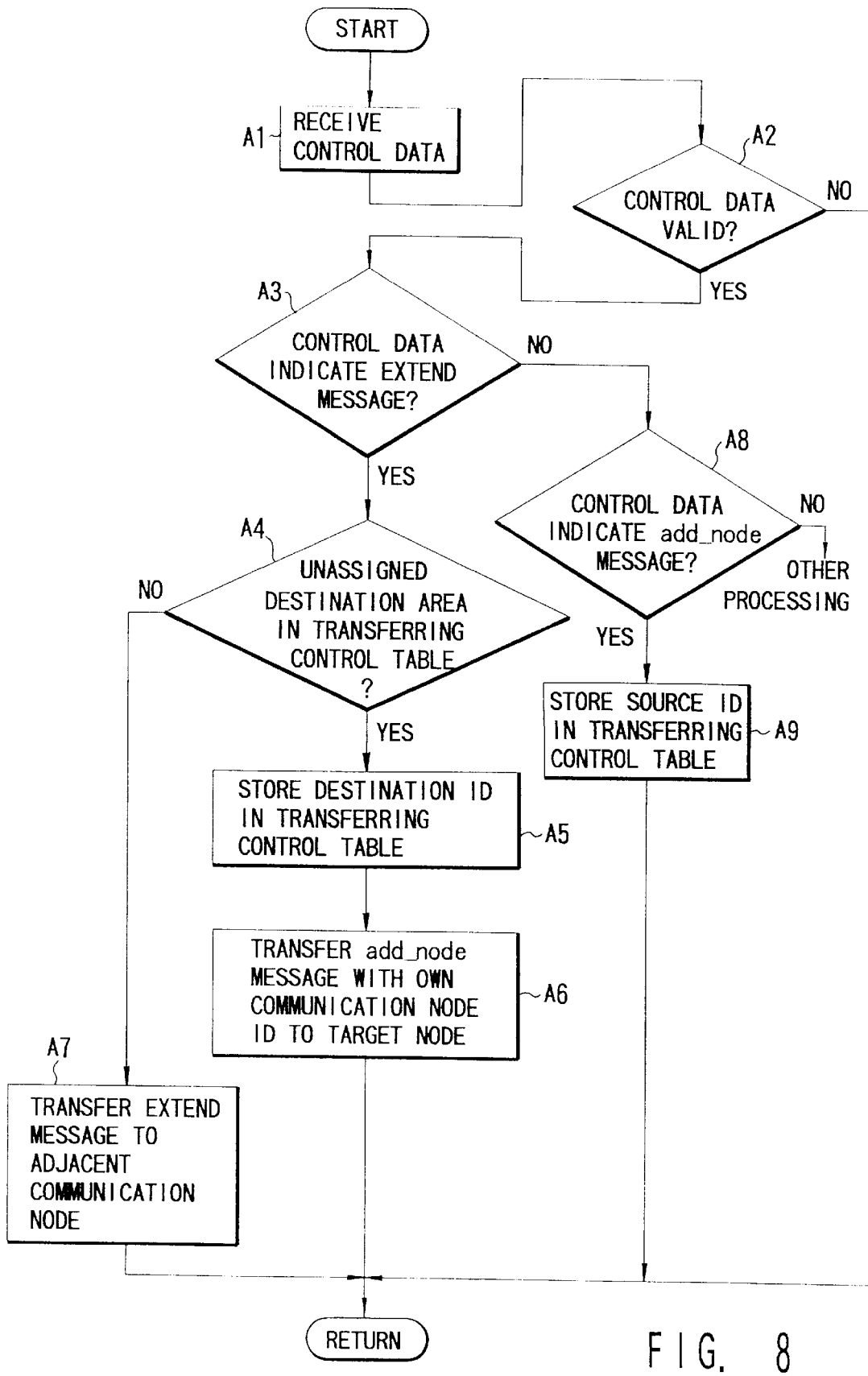
FIG. 8 is a flowchart showing the operating process of the communication node when the stream transfer path is set.

The operation procedure of the communication node 14 at the time of setting the stream transfer path is shown by the flowchart of FIG. 8. Further, the relation of the communication nodes (X1, X2, X3) for briefly explaining the state of the stream path is shown in FIG. 9.

Figure 9A:
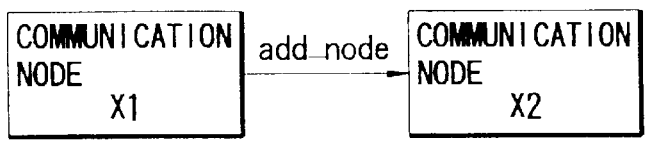
FIGS. 9A to 9D are diagrams showing the relation between the communication nodes for briefly illustrating the state of the stream transfer path in the process shown n FIG. 8.

First, the communication node X1 which is going to set the stream transfer path attaches its own communication node identifier as an attached parameter to the "add_node" message and transfers them to another communication node X2 (FIG. 9A).

The communication node X2 which has received the message (control data) first determines whether or not the attached identifier coincides with a previously set stream identifier or an application identifier so as to determine whether the received control data is adequate control data or not (steps A1, A2). When the received control data is not adequate control data, the communication node X2 transfers the message back to the source node (step A2, NO).

When the received control data is adequate control data, the following process is effected.

When the received message (control data) is an "add_node" message (A3, NO and A8, YES), the communication node X2 registers data indicating the communication node identifier attached to the "add_node" message in the column of the source area corresponding to one of the data transfer directions among two sets of source areas and destination areas (data transfer directions) in the transfer control table and the column of the destination area corresponding to the other data transfer direction by the control of the control section 20 (step A9).

Figure 9B:
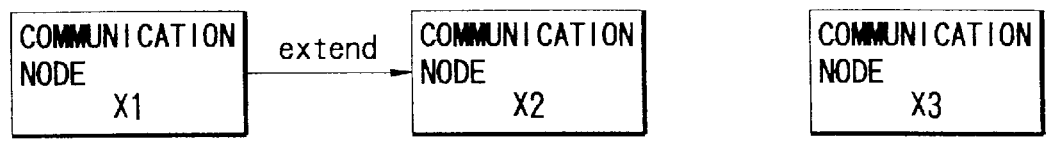

Further, in order to extend the stream transfer path, a communication node identifier (for example, communication node X3) indicating the destination of extension of the path is attached to the "extend" message by the communication node X1 and transferred to the communication node X2 (FIG. 9B).

When receiving the "extend" message (step A3, YES), the communication node X2 makes an attempt to extend the transfer path link to the communication node X3 specified by the attached parameter.

Figure 9C:
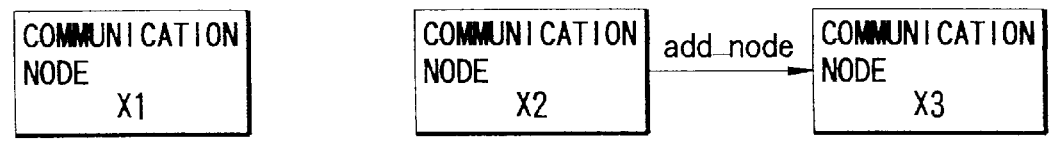

At this time, if there is an available column for the destination area in the transfer control table 20a (step A5, YES), the control section 20 of the communication node X2 enters a communication node identifier of the communication node X3 into the column of one of the destination areas among the two sets of source areas and destination areas (data transfer directions) and the column of the other source area (step A6), attaches its own communication node identifier to the "add_node" message and transfers the same to the communication node X3 (step A6, FIG. 9C).

Figure 9D:
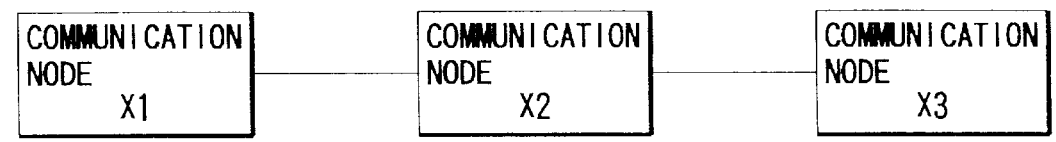

Like the communication node X2, the communication node X3 which has received the "add_node" message registers data indicating the communication node identifier attached to the "add_node" message in the column of the source area corresponding to one of the data transfer directions among the two sets of data transfer directions and in the column of the destination area corresponding to the other data transfer direction. Thus, a stream transfer path ranging from the communication node X1 to the communication node X3 via the communication node X2 is constructed (FIG. 9D).

When the "extend" message is received and if there is no available column in the destination area in the transfer control table (step A4, NO), the control section 20 of the communication node X2 transfers the "extend" message to the communication node which is already registered in the column of the destination area, that is, the adjacent communication node (step A7). In this case, the communication node which has received the transferred "extend" message executes the same process as that executed by the communication node X2 described before.

The application constructing the stream transfer path sequentially transfers the "extend" message to the connected communication nodes to extend the link of the stream transfer path so that a stream transfer path can be constructed between desired communication nodes.

Next, a process for connection of application is explained.

The application attaches an application identifier and stream identifier to an "add_app" message indicating connection of the application and then transfers message to the communication node 14 on the same network device so as to request access to a stream transfer path associated with the communication node 14.

In this embodiment, the value of the stream identifier attached to the "add_app" message is encoded and decoded and determined on the communication node 14 side which receives the "add_app" message. A coded stream is previously given to a regular application having the access right by a different means. Therefore, access from an application having no access right can be prohibited.

The communication node 14 (control section 20) which has received the "add_app" message decodes and determines the coded stream identifier attached to the "add_app" message, and if it is determined that the stream identifier is a valid stream identifier, it registers the content of the application identifier in the column of the application of the transfer control table. As the result of the above process, the application which is permitted to make connection access to the communication node 14 then transfers preset control data (message) so that the stream identifier can be related to transfer of stream data indicated by the stream identifier.

Next, a process relating to the starting of transfer of stream data is explained.

When a stream transfer path is constructed between the communication nodes 14, the application starts the transfer of data stream as follows. In this case, the application is not necessarily connected to the communication node 14 which is used as a terminal node for transferring stream data.

First, the application transfers a "start" message indicating the starting of transfer of stream data to the communication node 14 to which it is connected.

The communication node (control section 20) which has received the "start" message starts the transfer of stream data if it is a terminal node of the stream transfer path and is a node for transferring stream data. On the other hand, the communication node 14 refers to the transfer control table and transfers the "start" message to an adjacent communication node 14 indicated by the destination area if it is not a terminal node of the stream transfer path. The communication node 14 which has received the "start" message from the adjacent node effects the same process as that effected by the communication node 14 described before.

Thus, the "start" message issued from the application is transferred to the terminal node (communication node 14) for transferring stream data via the stream transfer path. The communication node 14 which is the terminal node starts the transfer of stream data via the stream transfer path in response to the "start" message.

Now, the process of stream data transfer in the communication node 14 is explained.

Stream data is transferred from one terminal node (communication node 14) of the stream transfer path, relayed via some communication nodes 14 and transferred to the other terminal node (communication node 14). The communication nodes associated with the stream transfer path store statistical information (transfer byte number, transfer error number, data arrival interval, data transfer interval and the like) relating to the transfer of stream data.

The communication nodes 14 for relaying the stream data each have functions of (1) timing adjustment, (2) filtering, and (3) data conversion.

The above functions are as follows.

(1) Timing Adjustment: The timing adjustment in the communication node 14 for relaying is to temporarily store received stream data into a buffer and transfer the stream data to a destination area at a timing specified from the exterior. Specification of the timing includes the maximum, minimum or average value relating to the data transfer rate and data transfer interval.

(2) Filtering: The filtering in the communication node 14 for relaying is a process for selectively transferring only part of received data and discarding the remaining portion, and a method of dealing with data which corresponds to the condition and setting of the data selecting condition is specified by the specification from the exterior.

(3) Data Conversion: Data conversion in the communication node 14 for relaying is to process received data by a method specified from the exterior and transfer the processed data to the destination area. Specification of the conversion method includes conversion of the data representing format.

Since the operation of the relay node can be specified from the exterior via the control communication network 10, the relay processing operation of the respective nodes associated with the stream transfer path can be generally controlled from the control node 16 (application) or master node.

Figure 10:
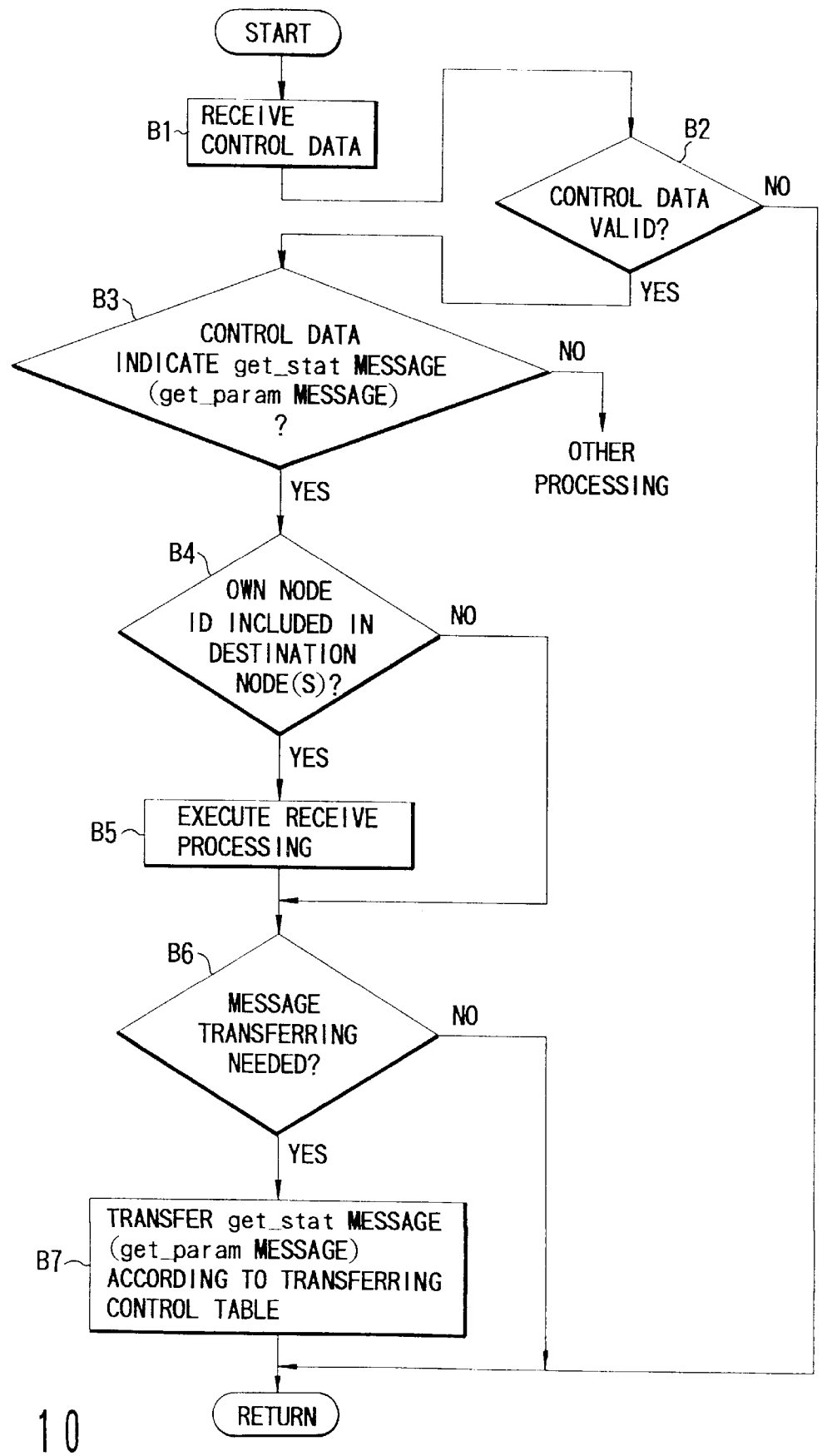
FIG. 10 is a flowchart showing the operating process of the communication node when the state of the data stream is acquired.

Next, the process of acquiring the state of stream transfer and transfer control parameter by the application is explained. FIG. 10 is a flowchart for illustrating the operating process of the communication node 14 when the state of data stream is acquired.

Since the master node has the privilege equivalent to that of the application (control node 16), it is assumed that the master node can make the same requests as those made by the application which will be described below and the explanation therefor is omitted.

First, the application attaches an identifier indicating the content of requested statistical data as an attached parameter to a "get_stat" message indicating acquisition of statistical data, specifies a destination communication node as an object of acquisition of statistical data by use of a destination node identifier and transfers the same to a communication node 14 to which it is connected.

The communication node 14 which has received control data determines whether the received control data is valid or not as in the process of the steps A1, A2 (steps B1, B2).

If the received control data is a "get_stat" message (step B3, YES), the communication node 14 determines whether or not it is contained in a specified destination communication node or nodes by comparing its own communication node identifier with the destination node identifier or identifiers in the message (step B4).

In this case, if the communication node 14 is the specified destination communication node, it performs the process for statistical data indicated by the identifier of the statistical data of the attached parameter as the process (reception process) for the received message (step B5).

Then, the communication node 14 determines whether it is necessary to transfer the "get_stat" message to another communication node 14 or not based on the destination node identifier (step B6). That is, the communication node 14 determines that it is necessary to transfer the "get_stat" message to another communication node 14 in a case where the destination node identifier is a broadcasting address, where the destination node identifier is a list containing a node identifier other than its own node identifier, or where the communication node is not a terminal node and the destination node identifier indicates a terminal node.

When it is necessary to transfer the "get_stat" message (B6, YES), the communication node 14 refers to the transfer control table 20a to transfer the "get_stat" message to an adjacent communication node 14 indicated by the destination area (step B7).

The communication node 14 which has received the "get_stat" message from the adjacent node executes the same process as that described before. Therefore, the "get_stat" message is transferred to all of the communication nodes 14 specified by the destination node identifier.

The communication node 14 which has received the "get_stat" message feeds back requested statistical information obtained by the reception process as result-of-process information of the attached parameter by use of an "ack" message indicating the acknowledgment.

Thus, the application (and the master node) can manage the stream transfer state of each communication node 14 on the stream transfer path.

The application can acquire the transfer control parameter during the stream data transferring operation. In this case, the application transfers a "get_param" message indicating acquisition of transfer control parameter to a communication node to which it is connected in the same manner as that described for the "get_stat" message.

The communication node 14 which has received the "get_stat" message executes the process in the same manner as illustrated by the flowchart shown in FIG. 10. Therefore, the application can acquire the transfer control parameter by the "ack" message.

Figure 11:
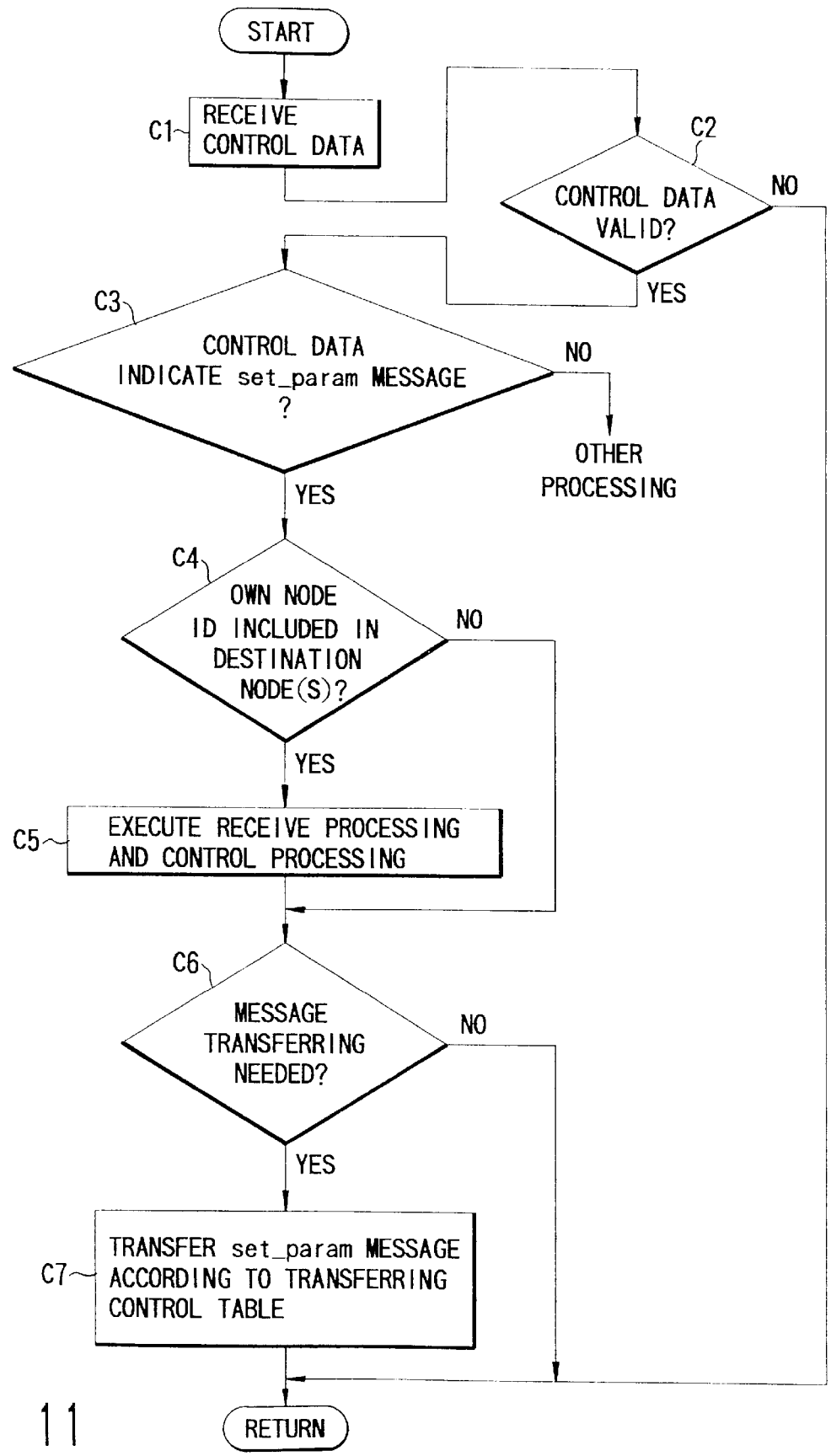
FIG. 11 is a flowchart showing the operating process of the communication node when the transfer control parameter is changed.

Next, setting of the transfer control parameter by the application is explained. The process of the communication node 14 for setting the transfer control parameter is shown in the flowchart of FIG. 11.

Since the master node has the privilege equivalent to that of the application (control node 16), it is assumed that it can make the same request as the application in the following explanation and the explanation therefor is omitted.

First, the application attaches an identifier indicating the content of a transfer control parameter to be set as an attached parameter to a "set_param" message indicating acquisition of statistical data, specifies a destination communication node which is an object of acquisition of the transfer control parameter by use of a destination node identifier, and transfers the same to a communication node 14 to which it is connected.

The communication node 14 which has received the control data determines whether the received control data is valid or not in the same manner as in the process of the steps A1, A2 (steps C1, C2).

If the received control data is a "set_param" message (step C3, YES), the communication node 14 determines whether or not it is contained in a specified destination communication node or nodes by comparing its own communication node identifier with the destination node identifier or identifiers in the message (step C4).

In this case, if the communication node 14 is the specified destination communication node, it performs the process for the parameter indicated by the identifier of the transfer control data of the attached parameter as the process (reception process) for the received message (step C5).

Then, the communication node 14 determines whether it is necessary to transfer the "set_param" message to another communication node 14 or not based on the destination node identifier (step C6). That is, the communication node 14 determines that it is necessary to transfer the "set_param" message to another communication node 14 in a case where the destination node identifier is a broadcasting address, where the destination node identifier is a list containing a node identifier other than its own node identifier, or where the communication node is not a terminal node and the destination node identifier indicates a terminal node.

When it is necessary to transfer the "set_param" message (C6, YES), the communication node 14 refers to the transfer control table 20a to transfer the "set_param" message to an adjacent communication node 14 indicated by the destination area (step C7).

The communication node 14 which has received the "set_param" message from the adjacent node executes the same process as that described before. Therefore, the "set_param" message is transferred to all of the communication nodes 14 specified by the destination node identifier.

Thus, the application (and the master node) can set a desired parameter value on each communication node 14 on the stream transfer path.

Next, the polling process by use of a "poll" message is explained.

A method of acquiring the stream transfer state and transfer control parameter based on the "get_stat" message and "set_param" message is attained by feeding back the "ack" message from the communication node 14 which has received the message. However, in the case of the "poll" message, a required one of the communication nodes 14 can effect the process for entering the content of a polling item identifier to be set in the attached parameter into the attached parameter (entered value) while the message is being transferred (polled) between the communication nodes 14.

Figure 12:
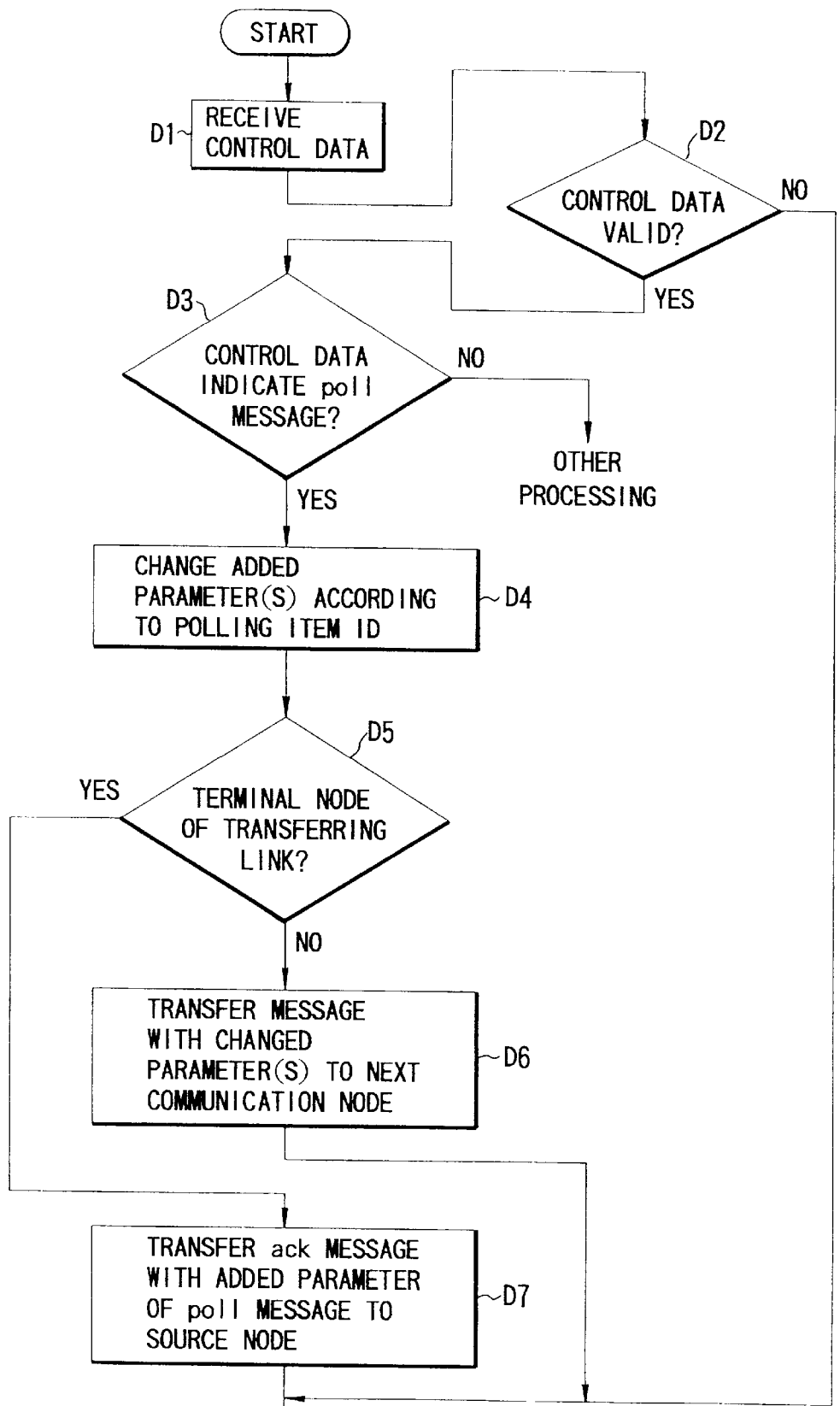
FIG. 12 is a flowchart showing the operating process of the communication node when the polling process is effected by use of a poll message.

The process of the communication node 14 effected when the polling process based on the "poll" message is effected is shown in the flowchart of FIG. 12.

The application (control node 16) or master node enters a terminal node of the transfer link into the destination node identifier and issues a "poll" message. When receiving the "poll" message, the communication node 14 determines whether the received control data is valid control data or not in the same manner as in the process of steps A1, A2 shown in FIG. 8 (steps D1, D2). The communication node 14 changes the entered value in the attached parameter according to the content indicated by the polling item identifier (step D4) and transfers the "poll" message to an adjacent communication node 14 indicated by the destination area of the transfer control table (steps D5, D6) if its own communication node is not a terminal node.

For example, as an example of the process for changing the entered value contained in the attached parameter, there is provided a process for deriving the maximum and minimum values of the throughput of stream data transfer by use of the number of transfer bytes of stream data of statistical data in order to detect a communication node 14 which causes a bottleneck among a plurality of communication nodes 14 on the stream transfer path.

In this case, each communication node 14 compares the entered value (transfer byte number of stream data) contained in the attached parameter of the "poll" message with the transfer byte number of stream data in a communication node 14 which the corresponding communication node manages and then rewrites the entered value contained in the attached parameter if the result of comparison indicates a corresponding value. That is, if the value is larger than the entered value, it is treated as the maximum value among the values for the communication nodes 14 on the path processed so far, and if the value is smaller than the entered value, it is treated as the minimum value, and the entered value of the attached parameter is rewritten according to the result.

Further, instead of rewriting the entered value as described above, it is possible to accumulate data indicating the acknowledgment content which each communication node 14 has in the respective communication nodes 14 so as to poll the "poll" message.

When the "poll" message has reached the communication node 14 which is the terminal node of the transfer link, the communication node 14 which is the terminal node executes the process according to the content of the polling item identifier in the same manner as in another communication node 14, attaches the content of the entered value written in the attached parameter of the "poll" message as processing result information to the "ack" message, and feeds back the same to the source node of the "poll" message (step D7).

As a result, the results of acknowledgment of all of the communication nodes 14 on the stream transfer path can be reflected on a single "poll" message.

It is not always necessary for all of the communication nodes 14 which have received the "poll" message to effect the process for changing the entered value contained in the attached parameter and it is possible to poll the substantial "poll" message only for desired communication nodes 14 on the stream transfer path by setting the condition of the communication node 14 specified as an object by use of the polling item identifier (in this case, it is possible to provide communication nodes 14 which do not effect the process according to the "poll" message even though the "poll" message itself is transferred thereto).

Next, the process relating to the stream transfer control by the master node is explained.

Figure 13A:
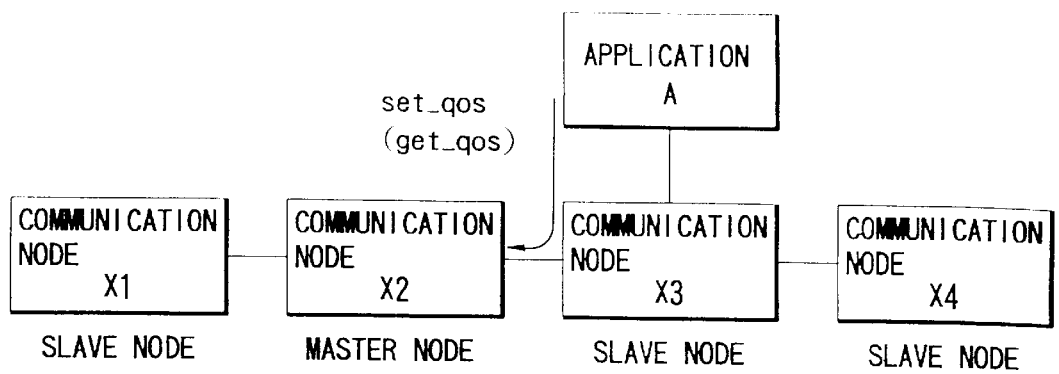
FIGS. 13A to 13C are diagrams showing the relation between the application and communication nodes for briefly illustrating the control of stream transfer by the master node.
Figure 13B:
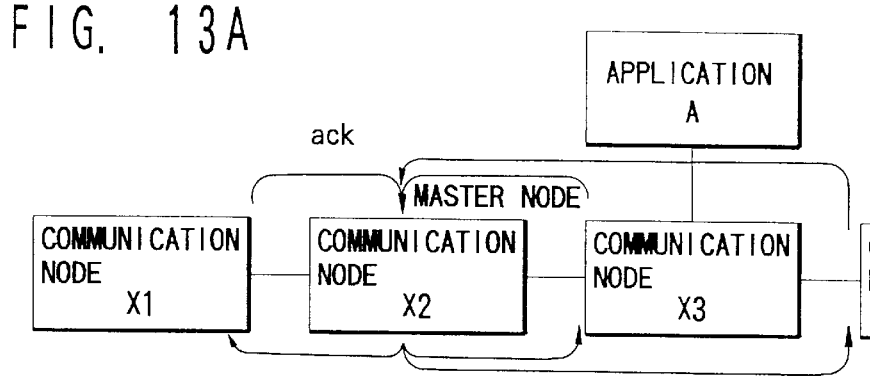
Figure 13C:
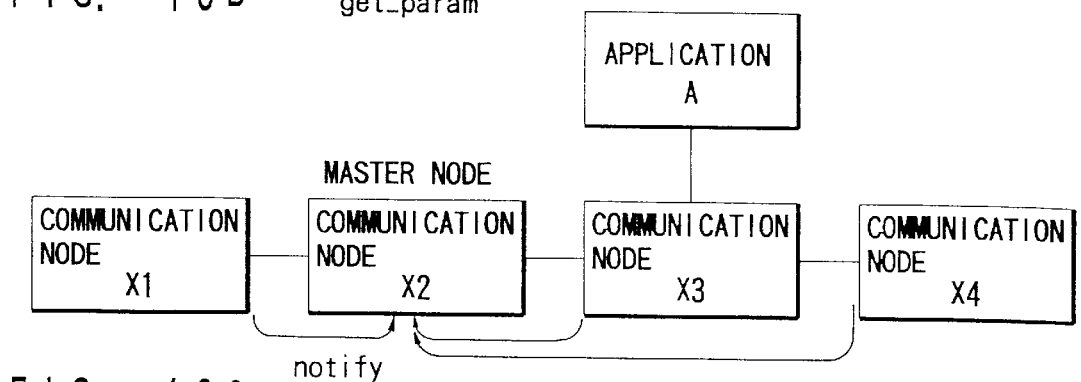

The relation between communication nodes (X1, X2, X3, X4) and the application A for briefly illustrating the control of stream transfer by the master node is shown in FIGS. 13A to 13C. In this case, an example in which a stream transfer path for transferring stream data from the communication node X1 to the communication node X4 via the communication nodes X2, X3 is shown. Further, it is assumed that the application A is connected to the communication node X3 and the master node is set in the communication node X2.

The application A can change the quality control parameter of stream data during the stream data transferring operation as follows (FIG. 13A).

The application A attaches a control parameter relating to the stream transfer quality as an attached parameter to a "set_qos" message indicating setting of the transfer quality parameter, enters a master node identifier into the destination node identifier and transfers the same to the communication node X3 to which it is connected.

In the attached parameter of the "set_qos" message, a condition (an identifier of the transfer quality condition) which must be satisfied to maintain the stream transfer state in the normal state and a processing method (an identifier of a processing method for coping with an abnormal state) effected when the normal state cannot be attained are set.

The communication node which has received the "set_qos" message refers to the transfer control table 20a and transfers the "set_qos" message to an adjacent communication node if it is not a master node and it is not a terminal node of the stream transfer path. Therefore, the "set_qos" message can be transferred to the master node irrespective of the location of the master node on the stream transfer path.

In the example shown in FIG. 13A, since the communication node X3 which has received the "set_qos" message is not the master node, it transfers the "set_qos" message to the adjacent communication nodes X2, X4. As a result, the "set_qos" message finally arrives at the communication node X2 which is the master node.

The communication node X2 effects the corresponding process for the "set_qos" message and transfers the result of processing to the application A which is the request source via the communication node X3 by use of the "ack" message.

Further, as shown in FIG. 13A, a "get_qos" message for requesting acquisition of a quality control parameter of stream data is transferred from the application A to the master node in the same process as in the case of "set_qos" message and a corresponding acknowledgment is transferred from the master node to the application A which is the request source by use of an "ack" message.

The master node has the privilege equivalent to that of the application with respect to the communication nodes 14 contained in the stream transfer path in which it is contained and can issue the above control message as well as the application.

That is, as shown in FIG. 13B, like the application, the communication node X2 which is the master node can issue a "get_param" message or "get_stat" message inquiring of another node as to the transfer state during the stream data transfer and can acquire the state of the whole stream transfer by acquiring an "ack" message which is the acknowledgment thereof.

Further, as shown in FIG. 13C, the slave node can voluntarily notify the master node (communication node X2) of occurrence of event or the state of stream transfer process by use of a "notify" message indicating notification.

If the stream transfer state thus collected in the master node does not satisfy the condition previously given to the "set_qos" message, the stream transfer control parameter is changed by use of the "set_param" message based on a previously given processing method, and the construction of the transfer path is modified by use of a "remove_node" message indicating removal of an adjacent node, an "add_node" message indicating an adjacent node and an "extend" message.

In a case where the master node itself is separated from the stream transfer path when the construction of the transfer path is thus modified, the master node is assigned to another communication node by use of a "master" message indicating assignment of the master node.

Figure 14:
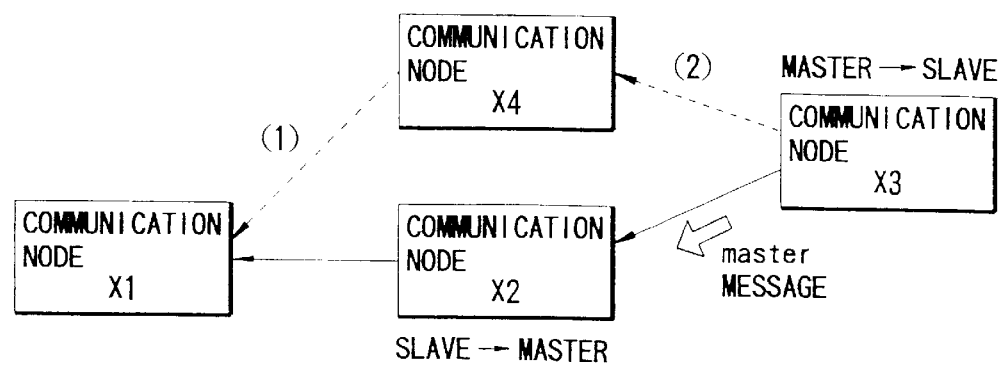
FIG. 14 is a diagram showing an example the control of stream transfer by the master node.

One example of the control operation of stream transfer by the master node is shown in FIG. 14.

It is assumed that the stream data transfer path of the communication nodes X3, X2, X1 is set in the initial stage in the construction of FIG. 14 and stream data is transferred from the communication node X3 which is the master node to the communication node X1 via the communication node X2.

Further, for example, it is assumed that, in the above communication system, the communication node X3 which is the master node detects that the load of the communication node X2 increases and causes a bottleneck according to a "get_stat" message, for example, during the stream transfer operation.

In this case, the master node can remove the communication node X2 by use of a "remove_node" message and newly set a stream transfer path passing through a communication node X4 as indicated by broken lines (1), (2) in FIG. 14 by issuing an "add_node" message and "extend" message.

Further, assignment of the master node is effected as follows.

For example, the communication node X3 transfers stream data to the communication node X2 at a transfer rate higher than the original transfer rate of transfer from the communication node X2 to the communication node X1 and releases the communication node X3 itself from the stream transfer process. The communication node X2 acts as a relay node to buffer the stream data transferred from the communication node X3 and transfer the same to the communication node X1 at the original transfer rate.

The communication node X3 can assign the master node by issuing the "master" message to the communication node X2 and set itself to a slave node so as to reduce the processing load thereof.

Thus, even a communication node which is a source node of stream data can assign the master node and even a communication node which is a destination node or a communication node acting as a relay node can change the master node according to the transfer state of stream data.

Next, the process for terminating the stream data transfer is explained.

When the transfer of stream data is terminated, a "stop" message is issued. The communication node 14 which has received the "stop" message can terminate the stream transfer operation by effecting the process which is in reverse relation to the process effected when the "start" message is received. Further, it can release the communication node associated with the stream transfer path by use of the "remove_node" message and "remove_app" message. The communication node 14 which has received the "remove_node" message effects the process which is in reverse relation to the process effected when the "add_node" message is received and the communication node 14 which has received the "remove_app" message effects the process which is in inverse relation to the process effected when the "add_node" message is received.

As described above, according to this invention, transfer of individual stream data items flowing on the network can be managed and controlled according to the application form thereof and since access to the stream can be limited to the associated user application, the security thereof can be ensured and accesses from a plurality of user applications can be simultaneously received. Further, by using the same transfer path for the transfer path of a control message and the transfer path of stream data, the overhead for managing the connection structure can be reduced and the maximum number of streams which can be processed by one node can be increased.

Only two sets of data items indicating the source and destination areas (data transfer directions) are registered on the transfer control table 20a only for clarifying the illustration, but three or more sets of source and destination areas can be registered in each communication node according to the number of stream transfers associated with the communication node.

The control communication network and the data communication network are not necessarily physically different networks.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

I claim:

1. A communication system comprising:
   a control communication network for transferring control data;
   a data communication network for transferring data;
   a plurality of communication nodes connected to said control communication network and data communication network; and
   at least one control means for controlling data transfer by said plurality of communication nodes, said at least one control means being connected to one of said control communication network and data communication network or one of said plurality of communication nodes;
   wherein each of said plurality of communication nodes includes:
   a control table;
   setting means for setting information indicating the transfer/reception direction of data transferred in predetermined data transfer and information indicating said control means associated with the data transfer and the communication node thereof into said control table according to control data transferred via said control communication network; and
   transferring means for transferring data transferred via said data communication network according to information stored in said control table.

2. A communication system according to claim 1, wherein each of said plurality of communication nodes includes means for determining the validity of the control data by referring to information stored in said control table according to control data transferred via said control communication network.

3. A communication system according to claim 1, wherein said control table has coded identifier information for identifying the data transfer, the control data includes coded identifier information for identifying associated data transfer, and each of said plurality of communication nodes includes means for notifying said control means of coded identifier information for identifying associated data transfer and determining the validity of the control data by referring to the identifier information of said control table according to control data transferred via said control communication network.

4. A communication system according to claim 1, wherein said control data includes a data transfer control request for a desired communication node and first identifier information inherent to the data transfer, said control table stores second identifier information for identifying data transfer with which the communication node having the control table is associated, and each of said plurality of communication nodes includes means for comparing the second identifier information with the first identifier information contained in control data transferred via said control communication network according to the control data and controlling said transferring means according to the result of comparison.

5. A communication system according to claim 1, wherein each of said plurality of communication nodes includes means for outputting control data for requesting acquisition of the state of another communication node to said control communication network; and means for setting a master node which manages a plurality of communication nodes associated with the data transfer to one of said plurality of communication nodes according to the acquired state.

6. A communication system according to claim 1, wherein each of said plurality of communication nodes includes means for outputting control data for assigning a master node to another communication node when the communication node is the master node; and means for managing a plurality of communication nodes associated with the data transfer according to control data transferred via said control communication network, for assigning the master node.

7. A communication system according to claim 1, wherein the control data contains a source identifier indicating a source node, information indicating a data transferring/receiving direction in said control table includes at least one pair of a source identifier and a destination identifier indicating a destination node, and each of said plurality of communication nodes includes processing means for outputting control data transferred via said control communication network according to a destination identifier corresponding to the source identifier of the received control data by referring to the information indicating the data transferring/receiving direction.

8. A communication system according to claim 7, wherein the control data contains a destination identifier indicating at least one communication node, and said processing means executes a process according to the control data when the identifier of the corresponding communication node is contained in the destination identifier of the received control data and outputs the control data according to a destination identifier corresponding to the source identifier of the received control data by referring to the information indicating the data transferring/receiving direction when an identifier indicating another communication node is contained in the above destination identifier.

9. A communication system according to claim 8, wherein the control data contains a state notifying request of a desired communication node, and said processing means issues the state of the corresponding communication node thereof to a communication node indicated by the source identifier of the control data in response to the state notifying request.

10. A communication system according to claim 7, wherein the control data contains a state notifying request of a desired communication node and a parameter and said processing means changes the parameter according to the state of the corresponding communication node thereof in response to the state notifying request.

11. A communication system according to claim 10, wherein the state of the communication node is defined by at least one of transfer control data, quality control data and statistical data.

12. A communication system according to claim 1, wherein the plurality of communication nodes are arranged in a stream transfer path.

13. A communication path control method for a plurality of communication nodes which are connected to a control communication network for transferring control data and a data communication network for transferring data, in which data transfer can be controlled by external control means and which each have a control table, comprising the steps of:

setting information indicating a data transferring/receiving direction of data transferred in predetermined data transfer and information indicating the control means associated with the data transfer and the communication node thereof into the control table according to control data transferred via said control communication network; and transferring for transferring data transferred via said data communication network according to information stored in the control table.

14. A communication path control method according to claim 13, further comprising the step of determining the validity of the control data by referring to information stored in the control table according to the control data transferred via said control communication network.

* * * * *